United States Patent
Takeda et al.

(10) Patent No.: US 7,309,960 B2
(45) Date of Patent: Dec. 18, 2007

(54) VEHICULAR LAMP WITH CURRENT CONTROLLING UNIT

(75) Inventors: Hitoshi Takeda, Shizuoka (JP); Masayasu Ito, Shizuoka (JP)

(73) Assignee: Koito Manufacturing Co., Ltd., Minato-ku, Tokyo (JP)

( * ) Notice: Subject to any disclaimer, the term of this patent is extended or adjusted under 35 U.S.C. 154(b) by 344 days.

(21) Appl. No.: 11/090,575

(22) Filed: Mar. 24, 2005

(65) Prior Publication Data

US 2005/0219851 A1   Oct. 6, 2005

(30) Foreign Application Priority Data

Apr. 6, 2004   (JP) ............................ 2004-112116

(51) Int. Cl.
*B60Q 1/02* (2006.01)

(52) U.S. Cl. ............... 315/83; 315/82; 315/291; 315/312; 315/247

(58) Field of Classification Search ........ 315/149–159, 315/291, 307, 312, 324, 82, 83, 247
See application file for complete search history.

(56) References Cited

U.S. PATENT DOCUMENTS 5,666,028 A * 9/1997 Bechtel et al. ............... 315/82
6,403,942 B1 * 6/2002 Stam ..................... 250/214 AL
6,495,973 B1 * 12/2002 Allen, Jr. ...................... 315/302
6,498,440 B2 * 12/2002 Stam et al. .................. 315/291
6,507,159 B2 * 1/2003 Muthu ......................... 315/307
2003/0193300 A1 * 10/2003 Mukherjee ................... 315/291
2003/0230991 A1 * 12/2003 Muthu et al. ................ 315/307
2004/0036418 A1 * 2/2004 Rooke et al. .................. 315/77
2005/0088102 A1 * 4/2005 Ferguson et al. ............ 315/149

FOREIGN PATENT DOCUMENTS

JP   2002-231014   8/2002

* cited by examiner

*Primary Examiner*—Tuyet Vo
(74) *Attorney, Agent, or Firm*—Fish & Richardson P.C.

(57) ABSTRACT

There is provided a vehicular lamp that can inform walkers or drivers in the other vehicles of the existence of the moving vehicle even where the circumference of the vehicle is bright by emitting a light amount larger than that of normal times when the circumference is bright. The vehicular lamp that is used for a vehicle includes a semiconductor light-emitting element, and a current controlling unit operable to increase an electric current flowing into the semiconductor light-emitting element according to a signal output from a sensor depending on a brightness of the circumference of the vehicle when the circumference of the vehicle is bright.

11 Claims, 8 Drawing Sheets

FIG. 1

| DRL SIGNAL | High | Low | | | | | | |
|---|---|---|---|---|---|---|---|---|
| TURN SWITCH SIGNAL | | Low | High | High | Low | High | Low | High |
| POSITION SIGNAL | Low | Low | Low | High | High | High | Low | High |
| MODE OF LED | IT IS TURNED ON AS DRL, AND IS TURNED ON WITH A LIGHT AMOUNT LARGER THAN THAT OF NORMAL TIMES WHEN THE CIRCUMFERENCE IS BRIGHT. | IT IS TURNED ON AS TURN SIGNAL LAMP WHEN TURN SIGNAL IS HIGH, AND IS TURNED OFF WHEN TURN SIGNAL IS LOW. | | | | IT IS TURNED OFF. | | |

VEHICULAR LAMP WITH CURRENT CONTROLLING UNIT

This patent application claims priority from a Japanese Patent Application No. 2004-112116 filed on Apr. 6, 2004, the contents of which are incorporated herein by reference.

BACKGROUND OF THE INVENTION

1. Field of the Invention

The present invention relates to a vehicular lamp. More specifically, the present invention relates to a vehicular lamp for a vehicle such as automobiles.

2. Description of Related Art

Conventionally, a vehicular lamp that uses a semiconductor light-emitting element is known as disclosed, for example, in Japanese Patent Laid-Open No. 2002-231014 (see pages 3 to 6 and FIGS. 1 to 13). In addition, a vehicle can illuminate a vehicular lamp in order to inform walkers of the existence of the vehicle in the daytime in some cases.

However, since the circumference of the vehicle is bright in the daytime, the walkers cannot be aware of light from the vehicular lamp in spite of lighting of the vehicular lamp, in some cases. In addition, since the circumference of the vehicle darkens at nightfall, light that is emitted from the vehicular lamp to inform walkers or drivers of the existence of the vehicle can give inconvenience to walkers or drivers in oncoming vehicles, in some cases.

SUMMARY OF THE INVENTION

Therefore, it is an object of the present invention to provide a vehicular lamp that can solve the foregoing problems. The above and other objects can be achieved by combinations described in the independent claims. The dependent claims define further advantageous and exemplary combinations of the present invention.

According to the first aspect of the present invention, there is provided a vehicular lamp that is used for a vehicle. The vehicular lamp includes: a semiconductor light-emitting element; and a current controlling unit operable to increase an electric current flowing into the semiconductor light-emitting element according to a signal output from a sensor depending on a brightness of the circumference of the vehicle when the circumference of the vehicle is bright.

The vehicular lamp may further include a position-controlled current supplying unit operable to supply an electric current to the semiconductor light-emitting element via the current controlling unit when a DRL signal input from a vehicle main body is active and a position signal input from the vehicle main body is non-active and to supply an electric current smaller than that flowing into the semiconductor light-emitting element when the DRL signal is active and the position signal is non-active to the semiconductor light-emitting element without passing through the current controlling unit when the position signal is active.

The vehicular lamp may further include a turn switch-controlled current supplying unit operable to supply an electric current to the semiconductor light-emitting element via the current controlling unit when a DRL signal input from a vehicle main body is active and a turn switch signal and a position signal input from the vehicle main body are non-active, to supply an electric current sufficient to illuminate the semiconductor light-emitting element as a turn signal lamp to the semiconductor light-emitting element without passing through the current controlling unit when the turn switch signal is active and a turn signal input from the vehicle main body is active, and not to supply an electric current to the current controlling unit and the semiconductor light-emitting element when the position signal is active and the turn switch signal is non-active.

The sensor may output a voltage depending on brightness of the circumference of the vehicle, the current controlling unit may control the current flowing into the semiconductor light-emitting element according to the received voltage, and the vehicular lamp may further include a turn switch-controlled voltage applying unit operable to apply a voltage output from the sensor to the current controlling unit when a DRL signal input from a vehicle main body is active and a turn switch signal and a position signal input from the vehicle main body are non-active, to apply a voltage, by which the current controlling unit flows an electric current sufficient to illuminate the semiconductor light-emitting element as a turn signal lamp into the semiconductor light-emitting element, to the current controlling unit without applying the voltage output from the sensor to the current controlling unit when the turn switch signal is active and a turn signal input from the vehicle main body is active, and to apply a voltage, by which the current controlling unit does not flow an electric current into the semiconductor light-emitting element, to the current controlling unit without applying the voltage output from the sensor to the current controlling unit when the position signal is active and the turn switch signal is non-active.

The summary of the invention does not necessarily describe all necessary features of the present invention. The present invention may also be a sub-combination of the features described above.

BRIEF DESCRIPTION OF THE DRAWINGS

The above and other objects and features and advantages of the present invention will become more apparent from the following description of the presently preferred exemplary embodiments of the invention taken in conjunction with the accompanying drawings, in which.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
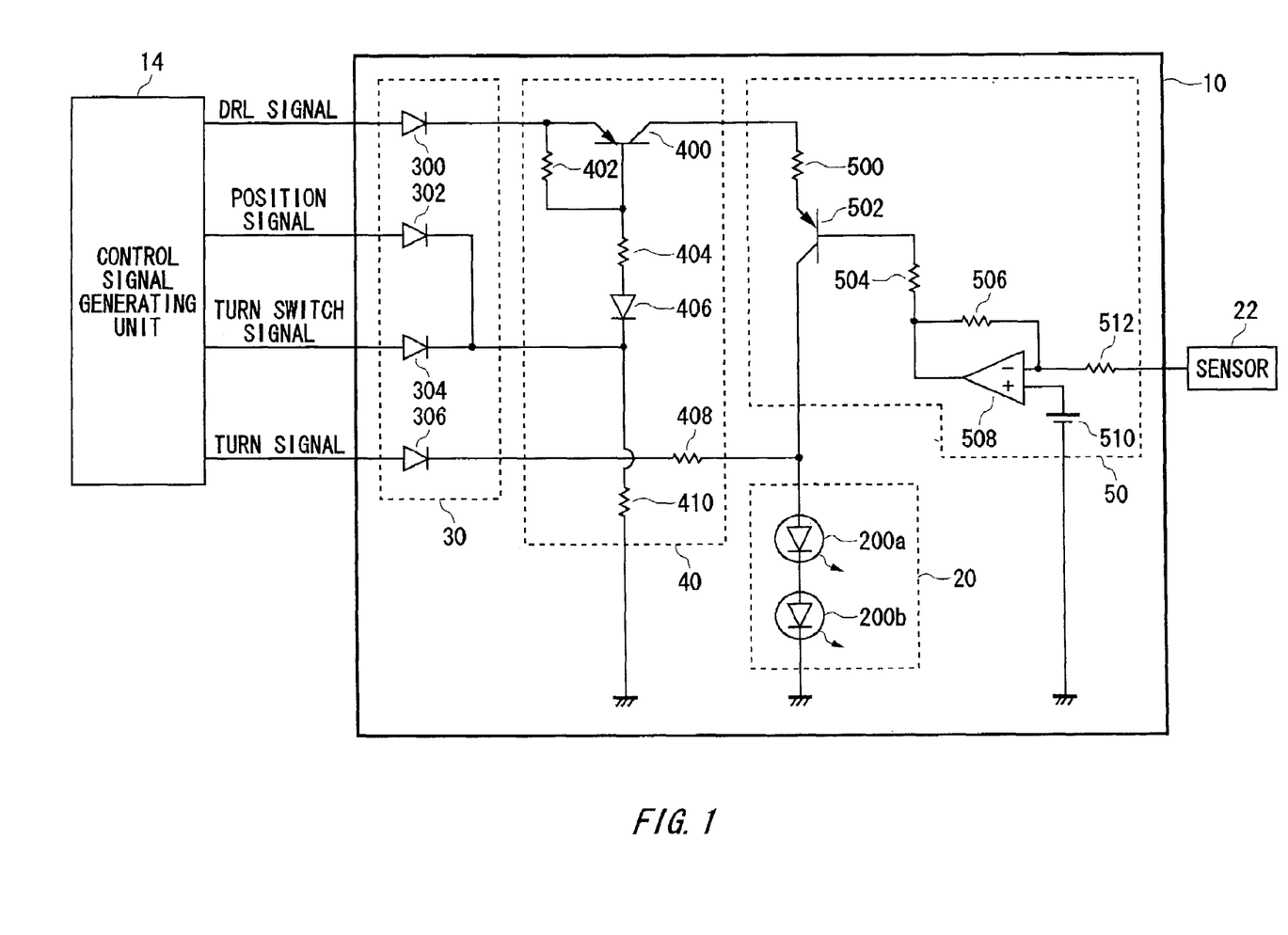
FIG. 1 is a view showing a configuration of a vehicular lamp according to an embodiment of the present invention along with a control signal generating unit.

FIG. 1 is a view showing a configuration of a vehicular lamp 10 according to an embodiment of the present invention along with a control signal generating unit 14. The vehicular lamp 10 according to the present embodiment informs walkers or the like of the existence of the moving vehicle even where the circumference of the vehicle is bright by emitting a light amount larger than that of normal times when the circumference is bright. The control signal generating unit 14 is provided in a vehicle main body and respectively generates a DRL signal that is a signal for turning on the vehicular lamp 10 as a DRL (Daytime Running Lamp), a position signal that is a signal for turning off the vehicular lamp 10 when illuminating a position lamp, a turn switch signal that is a signal for turning on the vehicular lamp 10 as a turn signal lamp, and a turn signal that is a signal for blinking on and off the vehicular lamp 10 as a turn signal lamp, in order to supply them to the vehicular lamp 10. In this example, the DRL signal is active when an engine of the vehicle is running. When the turn switch signal is active, the vehicular lamp 10 is blinked on and off in synchronization with the turn signal as a turn signal lamp. In addition, in this example, each of the DRL signal, the position signal, the turn switch signal, and the turn signal is active when the voltage is High.

Here, the DRL is a lamp that is illuminated in order to inform walkers or drivers in oncoming vehicles of the existence of the moving vehicle in the daytime. The position lamp is a lamp that is illuminated in order to inform walkers or drivers in oncoming vehicles of the existence or the width of the vehicle in the night. In this example, the DRL and the position lamp are separately provided in the vehicle. Thus, in the night, the position lamp is turned on and the DRL is turned off, and in the daytime, the DRL is turned on and the position lamp is turned off. The turn signal lamp is a lamp that blinks on and off in order to inform drivers in front and back vehicles of a turning, a course change, and so on of the vehicle.

The vehicular lamp 10 is used in a vehicle such as an automobile, and includes a light source 20, a signal input unit 30, a current supplying unit 40, and a current controlling unit 50. A sensor 22 is provided in the vehicle main body, and outputs a signal according to brightness of the circumference of the vehicle. In this example, the sensor 22 is a photodiode, and outputs a high voltage when the circumference of the vehicle is bright. In addition, the sensor 22 may be provided within the vehicular lamp 10. Furthermore, the sensor 22 may be configured to use a sensing function of an LED included in the light source 20. The signal input unit 30 has a plurality of diodes 300, 302, 304, and 306. A cathode of the diode 300 is connected to the current supplying unit 40, and an anode of the diode 300 receives the DRL signal. A cathode of the diode 302 is connected to the current supplying unit 40, and an anode of the diode 302 receives the position signal. A cathode of the diode 304 is connected to the cathode of the diode 302, and an anode of the diode 304 receives the turn switch signal. The diode 306 is connected to the current supplying unit 40, and an anode of the diode 306 receives the turn signal.

The current supplying unit 40 has a PNP transistor 400, a plurality of resistors 402, 404, 408, and 410, and a diode 406. An emitter terminal of the PNP transistor 400 is connected to the cathode of the diode 300, and its collector terminal is connected to the current controlling unit 50. A base terminal of the PNP transistor 400 is grounded through the resistor 404, the diode 406, and the resistor 410. The resistor 402 is connected between the emitter terminal and the base terminal of the PNP transistor 400. When the DRL signal is High, the PNP transistor 400 supplies an electric current to the current controlling unit 50 via the collector terminal.

A node between a cathode of the diode 406 and the resistor 410 is connected to the cathodes of the diodes 302 and 304. In this way, when the position signal or the turn switch signal is High, the PNP transistor 400 does not supply an electric current to the current controlling unit 50. One end of the resistor 408 is connected to the cathode of the diode 306, and the other end is connected to a node between the current controlling unit 50 and the light source 20. In this way, when the turn signal is High, the current supplying unit 40 supplies an electric current sufficient to illuminate the light source 20 as a turn signal lamp to the light source 20 through the diode 306 and the resistor 408. In addition, the signal input unit 30 and the current supplying unit 40 are an example of a turn switch-controlled current supplying unit in the present invention.

In this way, the current supplying unit 40 supplies an electric current to the light source 20 via the current controlling unit 50 when the DRL signal is High and the turn switch signal and the position signal are Low, supplies an electric current sufficient to illuminate the light source 20 as a turn signal lamp to the light source 20 without passing through the current controlling unit 50 when the turn switch signal is High and the turn signal is High, and does not supply an electric current to the current controlling unit 50 and the light source 20 when the position signal is High and the turn signal is Low.

The current controlling unit 50 includes a plurality of resistors 500, 504, 506, and 512, a PNP transistor 502, an operational amplifier 508, and a constant voltage source 510. An emitter terminal of the PNP transistor 502 is connected to the collector terminal of the PNP transistor 400 via the resistor 500, and a collector terminal of the PNP transistor 502 is connected to the light source 20. A base terminal of the PNP transistor 502 is connected to an output terminal of the operational amplifier 508 via the resistor 504. The resistor 506 is connected between a negative input terminal and the output terminal of the operational amplifier 508. The operational amplifier 508 receives an output voltage from the sensor 22 to the negative input terminal via the resistor 512, and receives a predetermined voltage from the constant voltage source 510 to a positive input terminal.

The operational amplifier 508 reverses a voltage received from the sensor 22 via the resistor 512 to apply the reversed voltage to the base terminal of the PNP transistor 502 via the resistor 504. When the sensor 22 outputs a high voltage, the operational amplifier 508 applies a low voltage to the base terminal of the PNP transistor 502 and flows a large current between the emitter and the collector of the PNP transistor 502. In addition, when the output voltage of the sensor 22 is lower than the voltage of the constant voltage source 510, the operational amplifier 508 applies a high voltage to the base terminal of the PNP transistor 502 and restricts an electric current flowing between the emitter and the collector of the PNP transistor 502. In this way, the current controlling unit 50 flows a large current from the current supplying unit 40 to the light source 20 when the circumference is bright.

The light source 20 has a plurality of semiconductor light-emitting elements 200a and 200b serially connected. Among the plurality of semiconductor light-emitting elements 200, an anode of the semiconductor light-emitting element 200 in an upstream end in the electric current direction is connected to the collector terminal of the PNP transistor 502 and the resistor 408. Among the plurality of semiconductor light-emitting elements 200, a cathode of the semiconductor light-emitting element 200 in downstream end is grounded. In addition, in another example, the light source 20 may have one semiconductor light-emitting element 200, or may have the plurality of semiconductor light-emitting elements 200 connected in parallel.

By such a configuration, when the vehicular lamp 10 is illuminated as the DRL, since the light source 20 can emit light with a light amount larger than that of normal times when the circumference of the vehicle is bright, it is possible to hold visibility of the light emitted from the vehicular lamp 10 even when the circumference of the vehicle is bright. In addition, the vehicular lamp 10 is used as the DRL and the turn signal lamp. In this way, since the DRL and the turn signal lamp can be configured by means of the same light source 20, it is possible to miniaturize the vehicular lamp 10.

Figure 2:
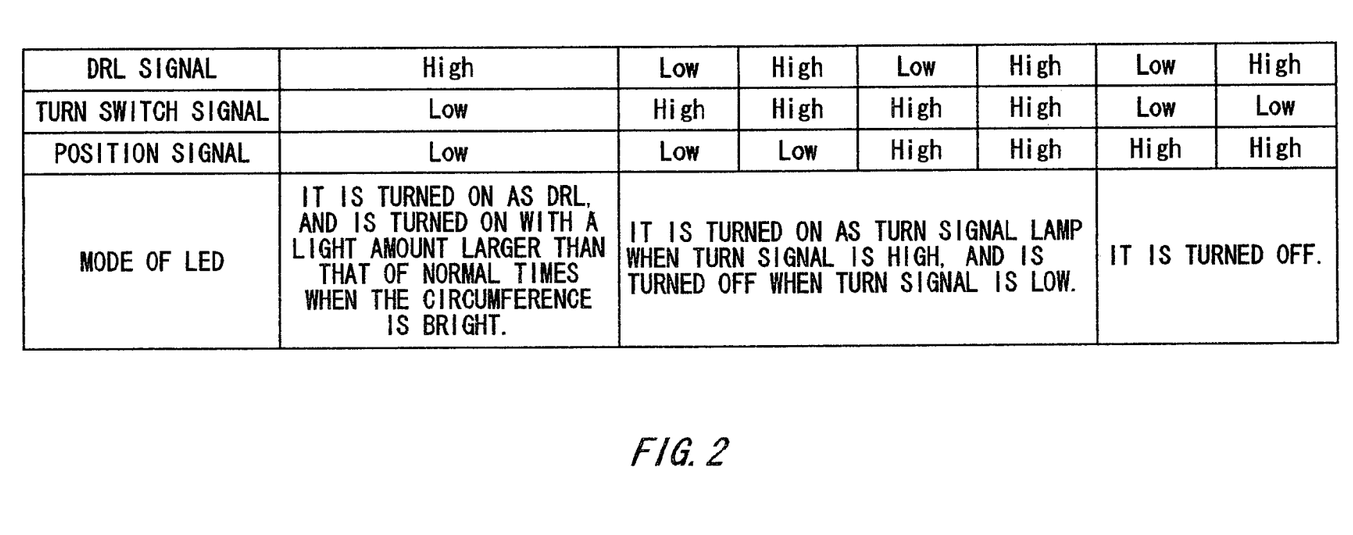
FIG. 2 is an association table showing a relationship between a signal generated from the control signal generating unit and an operation of the vehicular lamp.

FIG. 2 shows a relationship between a signal generated from the control signal generating unit 14 and an operation of the vehicular lamp 10. When the DRL signal is High and the turn switch signal and the position signal are Low, the vehicular lamp 10 is used as the DRL and emits light with a light amount larger than that of normal times when the circumference of the vehicle is bright. When the turn switch signal is High, the vehicular lamp 10 is turned on with a light amount sufficient to be used as a turn signal lamp when the turn signal is High and is turned off when the turn signal is Low. When the position signal is High and the turn signal is Low, the vehicular lamp 10 is turned off. In this case, the position lamp that is provided in another place in the vehicle is turned on.

Figure 3:
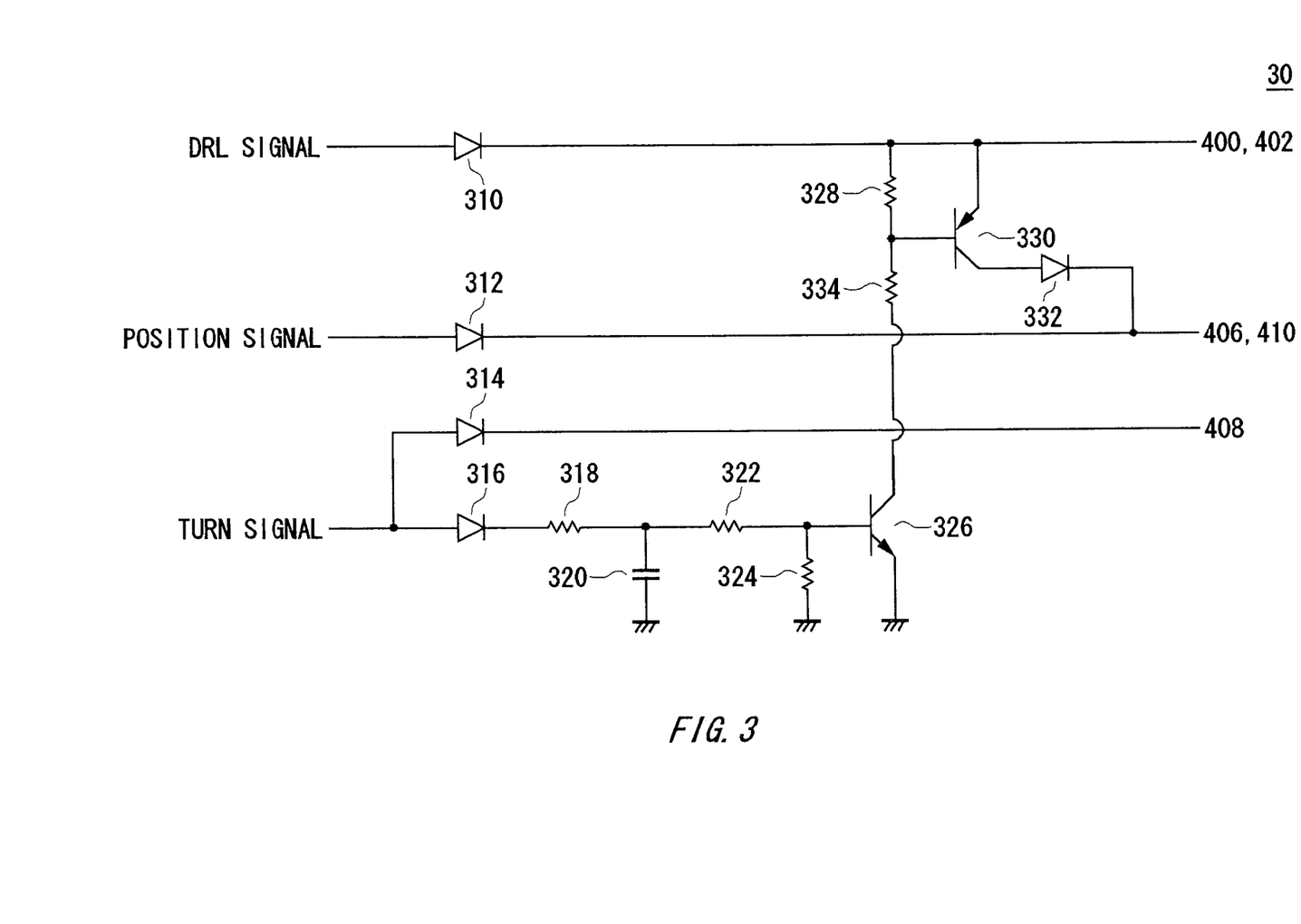
FIG. 3 is a view showing another example of a configuration of a signal input unit.

FIG. 3 is a view showing another example of a configuration of the signal input unit 30. The signal input unit 30 includes a plurality of diodes 310, 312, 314, 316, and 332, a plurality of resistors 318, 322, 324, 328, and 334, an NPN transistor 326, and a PNP transistor 330. A cathode of the diode 310 is connected to a collector terminal of the PNP transistor 400, and its anode receives the DRL signal from the control signal generating unit 14. A cathode of the diode 312 is connected to the cathode of the diode 406, and its anode receives the position signal from the control signal generating unit 14. A cathode of the diode 314 is connected to a node between the current controlling unit 50 and the light source 20 via the resistor 408, and its anode receives the turn signal from the control signal generating unit 14. A cathode of the diode 316 is connected to a base terminal of the NPN transistor 326 via the resistor 318 and the resistor 322, and its anode receives the turn signal from the control signal generating unit 14. One end of a condenser 320 is connected to a node between the resistor 318 and the resistor 322, and the other end is grounded. One end of the resistor 324 is connected to the base terminal of the NPN transistor 326, and the other end is grounded.

Here, the turn signal repeats High and Low at a duty ratio predetermined as the turn signal. In addition, a resistance value of the resistor 318 is smaller than that of the resistor 322. Therefore, the condenser 320 is charged through the resistor 318 at a rising edge of the turn signal by a time constant smaller than a time constant by which it is discharged through the resistor 322 and the resistor 324. In this way, when the turn signal that repeats High and Low at a predetermined ratio is input, the condenser 320 applies a voltage to keep the NPN transistor 326 on to the base terminal of the NPN transistor 326.

A collector terminal of the NPN transistor 326 is connected to a cathode of the diode 310 via the resistor 334 and the resistor 328, and an emitter terminal of the NPN transistor 326 is grounded. An emitter terminal of the PNP transistor 330 is connected to the cathode of the diode 310, its base terminal is connected to a node between the resistor 328 and the resistor 334, and its collector terminal is connected to an anode of the diode 332. A cathode of the diode 332 is connected to the cathode of the diode 406.

When the turn signal that repeats High and Low at a predetermined ratio is input, the NPN transistor 326 is turned on to apply a voltage depending on a resistance value of the resistor 328 and the resistor 334 to the base terminal of the PNP transistor 330. In this way, a voltage drop occurs between the emitter and the base of the PNP transistor 330 so as to turn on the PNP transistor 330, and thus the voltage of the cathode of the diode 406 is kept High via the diode 332. As described above, since the turn switch signal is generated using the turn signal, it is possible to reduce the signal supplied to the vehicular lamp 10. Therefore, the number of signal lines connected to the vehicular lamp 10 can be reduced, and thus the vehicular lamp 10 can be miniaturized.

Figure 4:
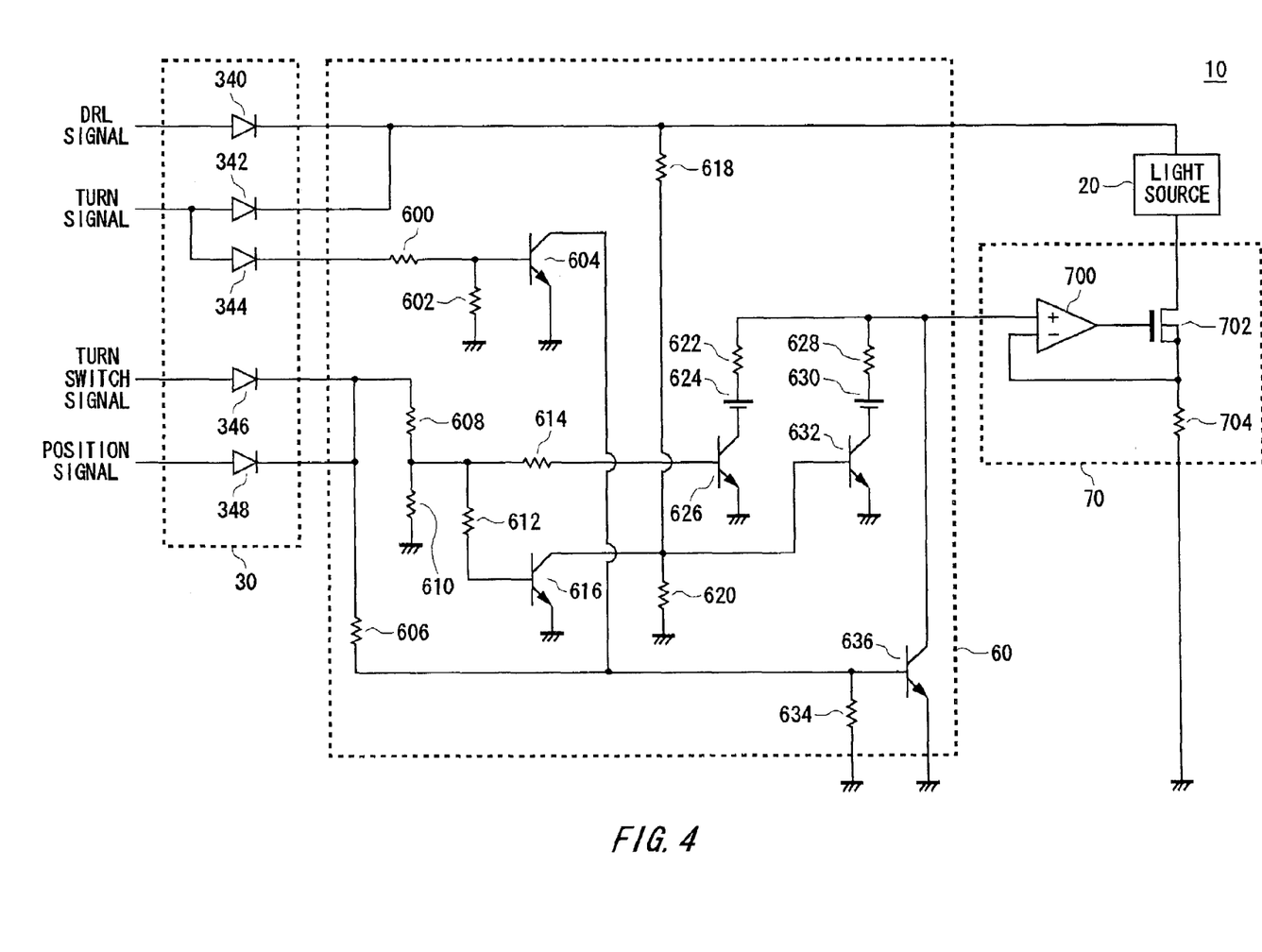
FIG. 4 is a view showing another example of a configuration of the vehicular lamp.

FIG. 4 is a view showing another example of a configuration of the vehicular lamp 10. In addition, since the components of FIG. 4 having the same reference numbers as those of FIG. 1 have the same or similar functions as or to those of FIG. 1, their descriptions will be omitted. The vehicular lamp 10 includes the light source 20, the signal input unit 30, a voltage applying unit 60, and a current controlling unit 70. The light source 20 is provided between the signal input unit 30 and the current controlling unit 70. The current controlling unit 70 is provided between the light source 20 and reference potential.

The signal input unit 30 has a plurality of diodes 340, 342, 344, 346, and 348. A cathode of the diode 340 is connected to an upstream end of the light source 20, and its anode receives the DRL signal from the control signal generating unit 14. A cathode of the diode 342 is connected to an upstream end of the light source 20, and its anode receives the turn signal from the control signal generating unit 14. A cathode of the diode 344 is connected to the voltage applying unit 60, and its anode receives the turn signal from the control signal generating unit 14. A cathode of the diode 346 is connected to the voltage applying unit 60, and its anode receives the turn switch signal from the control signal generating unit 14. A cathode of the diode 348 is connected to the voltage applying unit 60, and its anode receives the position signal from the control signal generating unit 14.

The voltage applying unit 60 includes a plurality of resistors 600, 602, 606, 608, 610, 612, 614, 618, 620, 622, 628, and 634, a plurality of NPN transistors 604, 616, 626, 632, and 636, and a plurality of constant voltage sources 624 and 630. A base terminal of the NPN transistor 632 receives a voltage that is made by dividing the DRL signal received through the diode 340 by the resistors 618 and 620. An emitter terminal of the NPN transistor 632 is grounded, and its collector terminal is connected to a negative electrode of the constant voltage source 630. A positive electrode of the constant voltage source 630 is connected to the current controlling unit 70 via the resistor 628. When the NPN transistor 632 is turned on, the voltage of the constant voltage source 630 is applied to the current controlling unit 70 via the resistor 628.

One end of the resistor 608 is connected to the cathodes of the diodes 346 and 348, and the other end is grounded through the resistor 610. A base terminal of the NPN transistor 616 is connected to a node between the resistor 608 and the resistor 610 via the resistor 612. A collector terminal of the NPN transistor 616 is connected to the base terminal of the NPN transistor 632, and an emitter terminal of the NPN transistor 616 is grounded. Thereby, when the turn switch signal or the position signal is High, the NPN transistor 616 is turned on so as to sink the current through the resistor 618. Thus, the NPN transistor 616 keeps the NPN transistor 632 off.

A base terminal of the NPN transistor 626 is connected to a node between the resistor 608 and the resistor 610 via the resistor 614. An emitter terminal of the NPN transistor 626 is grounded, and its collector terminal is connected to a negative electrode of the constant voltage source 624. A positive electrode of the constant voltage source 624 is connected to the current controlling unit 70 via the resistor 622. When the NPN transistor 626 is turned on, the voltage of the constant voltage source 624 is applied to the current controlling unit 70 via the resistor 622. In this way, when the turn switch signal or the position signal is High, the NPN transistor 626 is turned on. Thus, the voltage of the constant voltage source 630 is applied to the current controlling unit 70 via the resistor 622.

One end of the resistor 606 is connected to the cathodes of the diodes 346 and 348, and the other end is grounded via the resistor 634. A base terminal of the NPN transistor 636 is connected to a node between the resistor 606 and the resistor 634. A collector terminal of the NPN transistor 636 is connected to the resistor 622 and the resistor 628, and its emitter terminal is grounded. Thereby, when the turn switch signal or the position signal is High, the NPN transistor 636 is turned on so as to sink the current via the resistor 622 or the resistor 628.

One end of the resistor 600 is connected to the cathode of the diode 344, and the other end is grounded via the resistor 602. A base terminal of the NPN transistor 604 is connected to a node between the resistor 600 and the resistor 602. A collector terminal of the NPN transistor 604 is connected to the base terminal of the NPN transistor 636, and its emitter terminal is grounded. Thereby, when the turn signal is High, the NPN transistor 604 is turned on so as to keep the NPN transistor 636 off.

The current controlling unit 70 includes an operational amplifier 700, an nMOS transistor 702, and a resistor 704. A drain terminal of the nMOS transistor 702 is connected to a downstream end of the light source 20, and its source terminal is grounded via the resistor 704. A gate terminal of the nMOS transistor 702 is connected to an output terminal of the operational amplifier 700, and thus the nMOS transistor 702 flows an electric current according to a voltage received through the gate terminal between the drain terminal and the source terminal. The resistor 704 generates the voltage according to the current flowing between the drain terminal and the source terminal. The operational amplifier 700 receives the voltage generated on the resistor 704 through the negative input terminal, and receives the voltage from the voltage applying unit 60 through the positive input terminal. Thereby, the nMOS transistor 702 flows an electric current between the drain terminal and the source terminal. Here, the current lessens the difference between the voltage received from the voltage applying unit 60 and the voltage generated on the resistor 704. Therefore, the current controlling unit 70 flows the current according to the voltage received from the voltage applying unit 60 into the light source 20. In this case, when the voltage applied to the positive input terminal of the operational amplifier 700 is high, the nMOS transistor 702 increases the current flowing into the light source 20.

In addition, the constant voltage source 624 generates an electric current necessary to illuminate the light source 20 as a turn signal lamp so that the current controlling unit 70 flows the voltage into the light source 20. Moreover, the constant voltage source 630 generates an electric current necessary to illuminate the light source 20 as a DRL so that the current controlling unit 70 flows the voltage into the light source 20.

By such a configuration, when the DRL signal is High and the turn switch signal and the position signal are Low, the voltage applying unit 60 applies the voltage generated form the constant voltage source 630 to the current controlling unit 70. Moreover, when the turn switch signal is High and when the turn signal is High, the voltage applying unit 60 applies the voltage generated form the constant voltage source 624 to the current controlling unit 70 without applying the voltage generated form the constant voltage source 630 to the current controlling unit 70. Furthermore, when the position signal is High, the voltage applying unit 60 applies the voltage, by which the current controlling unit 70 does not flow the current into the light source 20, to the current controlling unit 70. In this way, the vehicular lamp 10 can be illuminated as a DRL and a turn signal lamp.

Figure 5:
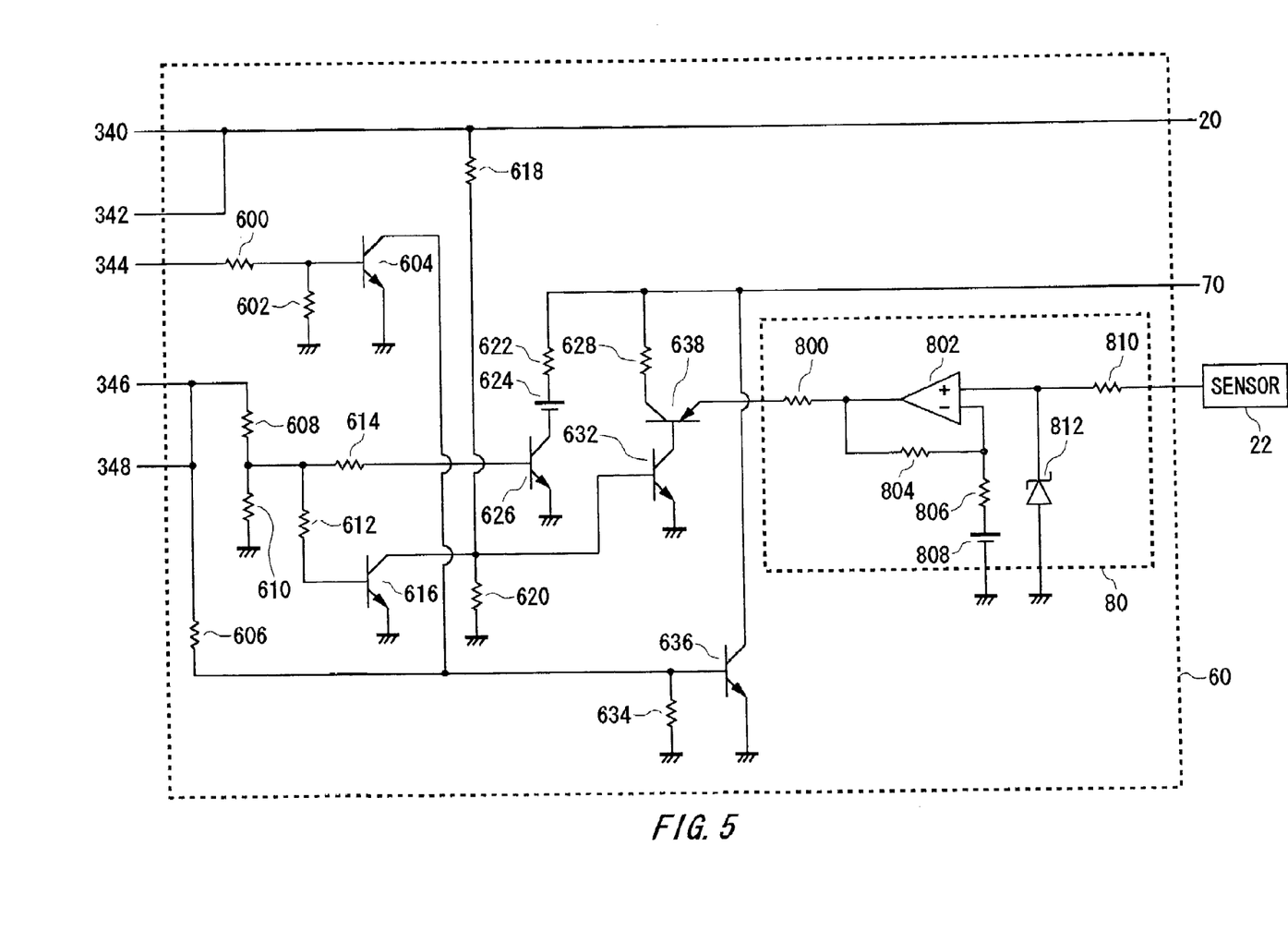
FIG. 5 is a view showing another example of a configuration of a voltage applying unit.

FIG. 5 is a view showing another example of a configuration of the voltage applying unit 60. In addition, since the components of FIG. 5 having the same reference numbers as those of FIG. 4 have the same or similar functions as or to those of FIG. 4, their descriptions will be omitted. The vehicular lamp 10 receives a signal (a voltage) from the sensor 22. The voltage applying unit 60 further has a PNP transistor 638 and a voltage amplifying unit 80. A base terminal of the PNP transistor 638 is connected to the collector terminal of the NPN transistor 632, an emitter terminal of the PNP transistor 638 is connected to the voltage amplifying unit 80, and a collector terminal of the PNP transistor 638 is connected to the positive input terminal of the operational amplifier 700 via the resistor 628.

The voltage amplifying unit 80 has a plurality of resistors 800, 804, 806, and 810, an operational amplifier 802, a constant voltage source 808, and a Zener diode 812. The operational amplifier 802 receives an output voltage from the sensor 22 to its positive input terminal through the resistor 810. A cathode of the Zener diode 812 is connected to the positive input terminal of the operational amplifier 802, and its anode is grounded. Thereby, the positive input terminal of the operational amplifier 802 receives a voltage less than that restricted by the Zener diode 812 from the sensor. A negative terminal of the constant voltage source 808 is grounded, and its positive terminal is connected to a negative input terminal of the operational amplifier 802 via the resistor 806. One end of the resistor 804 is connected to the negative input terminal of the operational amplifier 802, and the other end is connected to an output terminal of the operational amplifier 802. One end of the resistor 800 is connected to the output terminal of the operational amplifier 802, and the other end is connected to the emitter terminal of the PNP transistor 638. In this way, the operational amplifier 802 amplifies the voltage received through the positive input terminal at an amplification factor prescribed by the resistor 804, the resistor 806, and the constant voltage source 808, and applies the amplified voltage to the emitter terminal of the PNP transistor 638 via the resistor 800.

By such a configuration, when the DRL signal is High and the turn switch signal and the position signal are Low, the voltage applying unit 60 applies the voltage generated from the sensor 22 to the current controlling unit 70 via the voltage amplifying unit 80, the PNP transistor 638, and the resistor 628. Moreover, when the turn switch signal is High and the turn signal is High, the voltage applying unit 60 applies a voltage, by which the current controlling unit 70 flows an electric current sufficient to illuminate the light source 20 as a turn signal lamp into the light source 20, to the current controlling unit 70. Thereby, the DRL and the turn signal lamp can be configured using the same light source 20 as each other, and also visibility of light emitted from the vehicular lamp 10 that is used as the DRL can be kept even though the circumference of the vehicle is bright.

Figure 6:
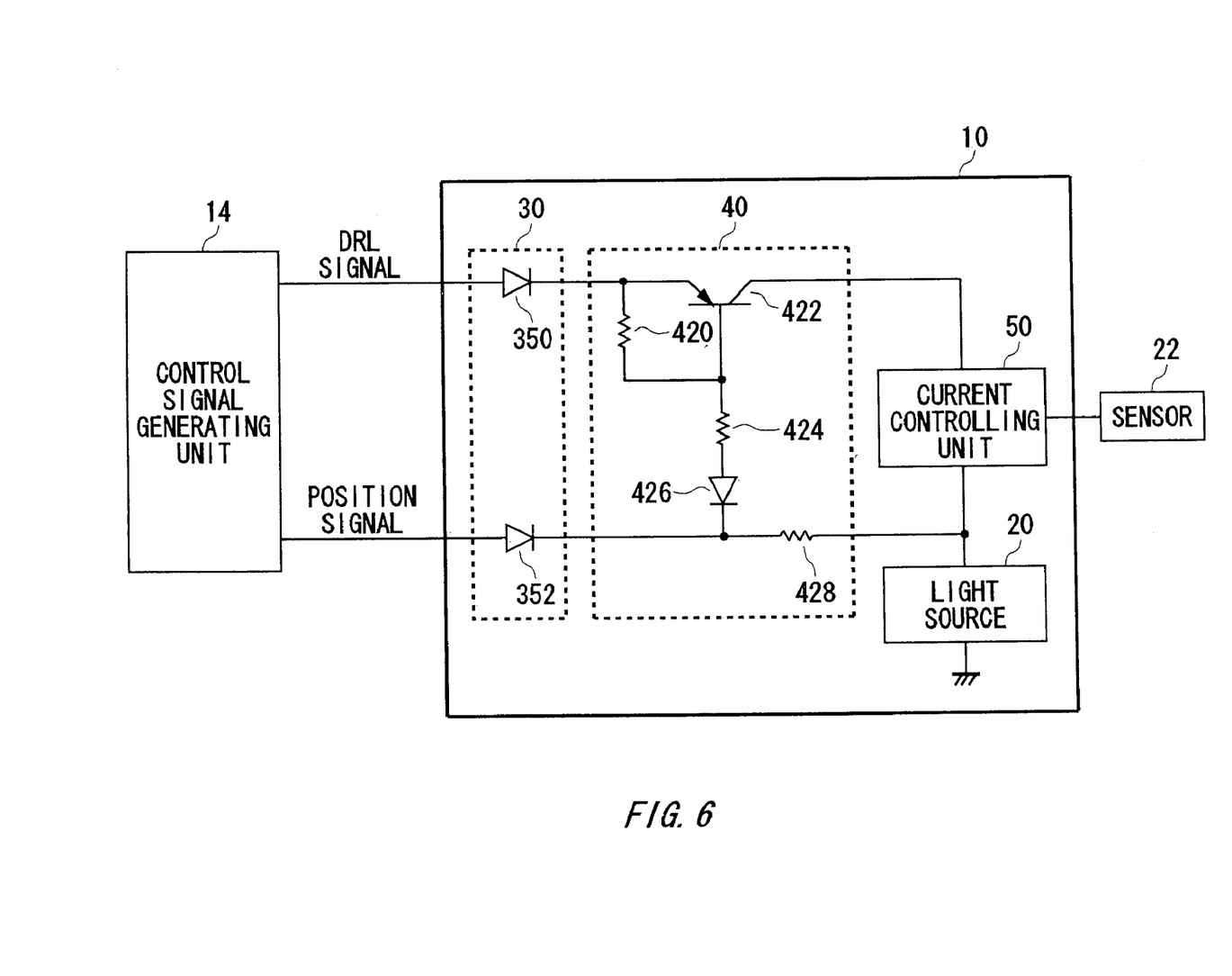
FIG. 6 is a view showing further another example of a configuration of the vehicular lamp.

FIG. 6 is a view showing further another example of a configuration of the vehicular lamp 10. In addition, since the components of FIG. 6 having the same reference numbers as those of FIG. 1 have the same or similar functions as or to those of FIG. 1, their descriptions will be omitted. The vehicular lamp 10 includes the light source 20, the signal input unit 30, the current supplying unit 40, and the current controlling unit 50. The signal input unit 30 has a plurality of diodes 350 and 352. A cathode of the diode 350 is connected to the current supplying unit 40, and its anode receives the DRL signal from the control signal generating unit 14. A cathode of the diode 352 is connected to the current supplying unit 40, and its anode receives the position signal from the control signal generating unit 14.

The current supplying unit 40 has a plurality of resistors 420, 424, and 428, a PNP transistor 422, and a diode 426. An emitter terminal of the PNP transistor 422 is connected to the cathode of the diode 350, and its collector terminal is connected to the current controlling unit 50. A base terminal of the PNP transistor 422 is connected to an anode of the diode 426 via the resistor 424. The resistor 420 is connected between the emitter terminal and base terminal of the PNP transistor 422. A cathode of the diode 426 is connected to the cathode of the diode 352. Moreover, the cathode of the diode 426 is connected to a node between the current controlling unit 50 and the light source 20 via the resistor 428. In addition, the current supplying unit 40 is an example of a position-controlled current supplying unit in the present invention.

By such a configuration, when the DRL signal is High and the position signal is Low, the PNP transistor 422 is turned on so as to supply an electric current to the current controlling unit 50 via its collector terminal. Moreover, when the position signal is High, a resistance value of the resistor 428 is set to supply an electric current, by which the light source 20 is not sufficient to be used as the DRL but is sufficient to be used as the position lamp, to the light source 20. Thereby, when the position signal is High, the current supplying unit 40 supplies an electric current smaller than that flowing into the light source 20 when the DRL signal is High and the position signal is Low, to the light source 20 without passing through the current controlling unit 50. In this way, since the DRL and the position lamp can be configured using the same light source 20, the vehicular lamp 10 can be miniaturized.

Figure 7:
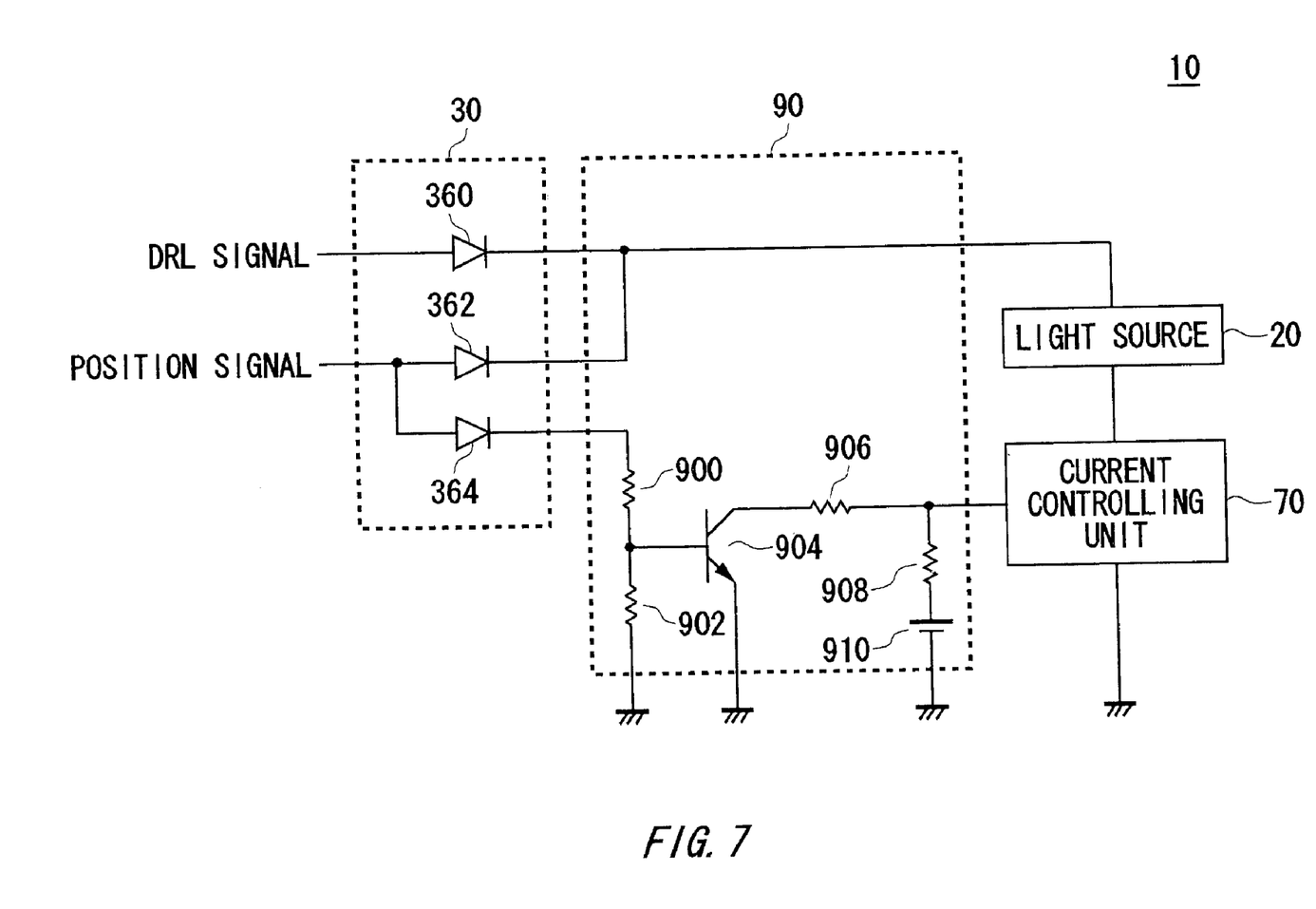
FIG. 7 is a view showing further another example of a configuration of the vehicular lamp.

FIG. 7 is a view showing further another example of a configuration of the vehicular lamp 10. In addition, since the components of FIG. 7 having the same reference numbers as those of FIG. 6 have the same or similar functions as or to those of FIG. 6, their descriptions will be omitted. The vehicular lamp 10 includes the light source 20, the signal input unit 30, the current controlling unit 70, and a voltage applying unit 90. The signal input unit 30 has a plurality of diodes 360, 362, and 364. A cathode of the diode 360 is connected to an upstream end of the light source 20, and its anode receives the DRL signal from the control signal generating unit 14. A cathode of the diode 362 is connected to the upstream end of the light source 20, and its anode receives the position signal from the control signal generating unit 14. A cathode of the diode 364 is connected to the voltage applying unit 90, and its anode receives the position signal from the control signal generating unit 14.

The voltage applying unit 90 has a plurality of resistors 900, 902, 906, and 908, an NPN transistor 904, and a constant voltage source 910. One end of the resistor 900 is connected to the cathode of the diode 364, and the other end is grounded via the resistor 902. An emitter terminal of the NPN transistor 904 is grounded, and its collector terminal is connected to a positive electrode of the constant voltage source 910 via the resistors 906 and 908. A base terminal of the NPN transistor 904 is connected to a node between the resistor 900 and the resistor 902. A node between the resistor 906 and the resistor 908 is connected to the current controlling unit 70.

Here, when the DRL signal is High and the position signal is Low, the NPN transistor 904 is turned off and thus the current controlling unit 70 receives the voltage of the constant voltage source 910 via the resistor 908. Then, the current controlling unit 70 illuminates the light source 20 according to the voltage prescribed by the constant voltage source 910 and the resistor 908. Moreover, when the position signal is High, the NPN transistor 904 is turned on by the voltage that is divided by the resistors 900 and 902, and thus sinks the voltage of the constant voltage source 910 via the resistors 908 and 906. In this way, the current controlling unit 70 receives a voltage that is made by dividing the voltage of the constant voltage source 910 by the resistors 906 and 908. For that purpose, the current controlling unit 70 illuminates the light source 20 using the current smaller than that flowing into the light source 20 when the DRL signal is High and the position signal is Low. In this example, since the DRL and the position lamp can be configured using the same light source 20, the vehicular lamp 10 can be miniaturized.

Figure 8:
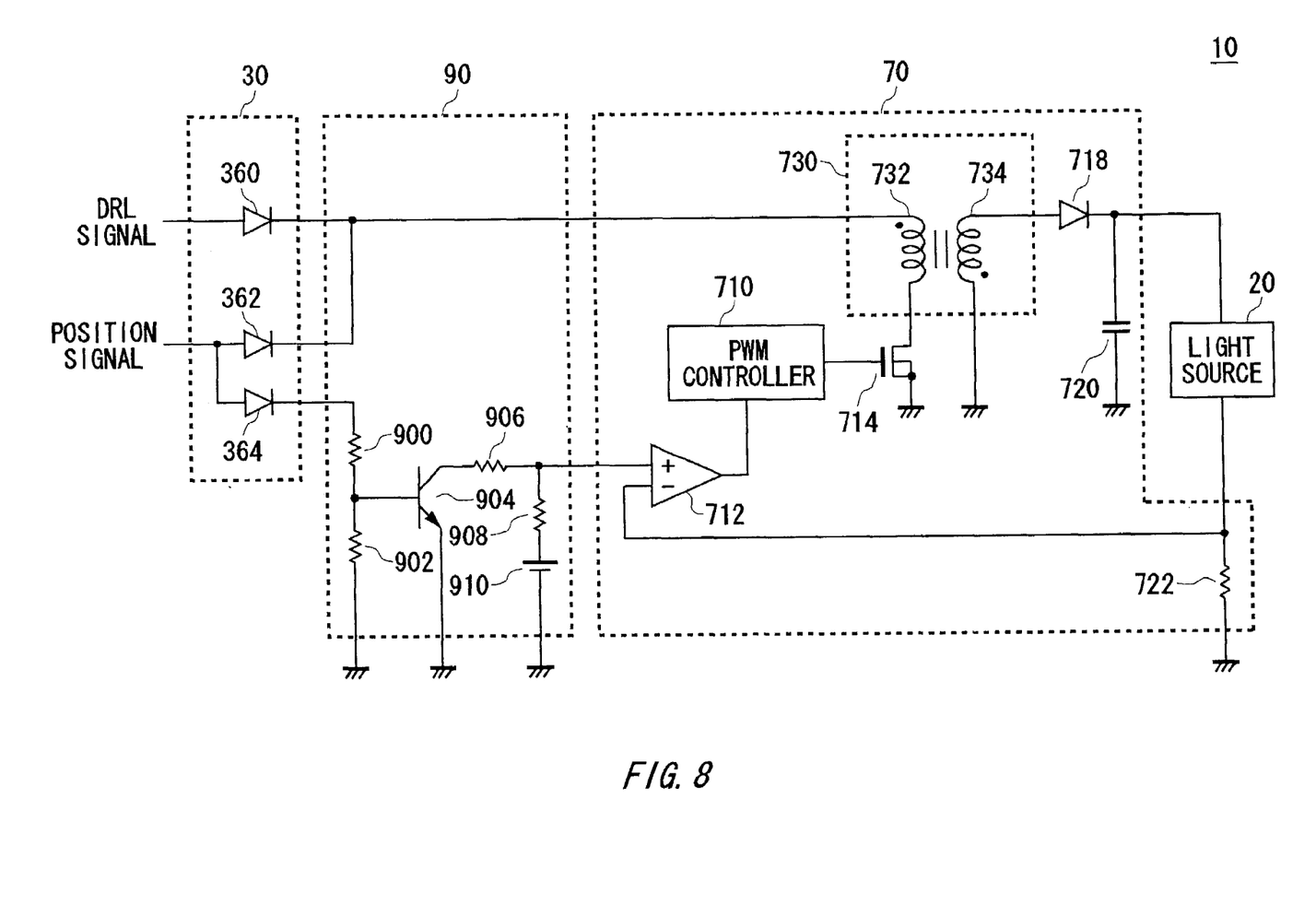
FIG. 8 is a view showing further another example of a configuration of the vehicular lamp.

FIG. 8 is a view showing further another example of a configuration of the vehicular lamp 10. In addition, since the components of FIG. 8 having the same reference numbers as those of FIG. 7 have the same or similar functions as or to those of FIG. 7, their descriptions will be omitted. The current controlling unit 70 includes a pulse width modulation controller 710, an operational amplifier 712, an nMOS transistor 714, a diode 718, a condenser 720, a resistor 722, and a transformer 730. The transformer 730 has a primary coil 732 and a secondary coil 734. The primary coil 732 and the secondary coil 734 are set by a predetermined turn ratio. One end of the primary coil 732 is connected to the cathode of the diode 360, and the other end is connected to a drain terminal of the nMOS transistor 714. A source terminal of the nMOS transistor 714 is grounded, and the nMOS transistor 714 makes an electric current flowing into the primary coil 732 on and off.

One end of the secondary coil 734 is grounded, and the other end is connected to an anode of the diode 718. A cathode of the diode 718 is connected to the upstream end of the light source 20. One end of the condenser 720 is grounded, and the other end is connected to the cathode of the diode 718. In this way, the diode 718 and the condenser 720 rectify the current, which is received through the secondary coil 734 and is changed intermittently, into a direct current in order to supply the current to the light source 20.

The resistor 722 is provided in series with the light source 20 between the downstream end of the light source 20 and the reference potential, and generates the voltage according to the current flowing into the light source 20. A positive input terminal of the operational amplifier 712 is connected to a node between the resistor 906 and the resistor 908, and its negative input terminal is connected to a node between the light source 20 and the resistor 722. The pulse width modulation controller 710 outputs a rectangular wave that repeats High and Low at a duty ratio depending on the received voltage value. The pulse width modulation controller 710 receives an output voltage from the operational amplifier 712, and supplies a rectangular wave with a duty ratio by the voltage received from the operational amplifier 712 to a gate terminal of the nMOS transistor 714. In this way, the pulse width modulation controller 710 controls the current flowing into the light source 20 according to the voltage received from the voltage applying unit 90. Also in this example, since the DRL and the position lamp can be configured using the same light source 20, the vehicular lamp 10 can be miniaturized.

As is apparent from the description, the vehicular lamp 10 of the present invention can inform walkers or the like of the existence of the moving vehicle even where the circumference of the vehicle is bright by emitting a light amount larger than that of normal times when the circumference is bright.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

What is claimed is:

1. A vehicular lamp comprising:
   a semiconductor light-emitting element;
   a current controlling unit operable to increase an electric current flowing into said semiconductor light-emitting element according to a signal output from a sensor depending on a brightness of the circumference of the vehicle when the circumference of the vehicle is bright; and
   a position-controlled current supplying unit operable to supply an electric current to said semiconductor light-emitting element via said current controlling unit when a DRL signal input from a vehicle main body is active and a position signal input from the vehicle main body is non-active and to supply an electric current smaller than that flowing into said semiconductor light-emitting element when the DRL signal is active and the position signal is non-active to said semiconductor light-emitting element without passing through said current controlling unit when the position signal is active.

2. The vehicular lamp as claimed in claim 1, for an automobile comprising a light source, a signal input unit, a current supplying unit, and a current controlling unit.

3. The vehicular lamp as claimed in claim 2, wherein the signal input unit comprises a plurality of diodes.

4. The vehicular lamp as claimed in claim 2, wherein the current supplying unit comprises a PNP transistor, a plurality of resistors, and a diode.

5. The vehicular lamp as claimed in claim 2, wherein the current controlling unit comprises a plurality of resistors, a PNP transistor, an operational amplifier, and a constant voltage source.

6. The vehicular lamp as claimed in claim 1, wherein the vehicular lamp comprises a light source, the signal input unit, a voltage applying unit, and a current controlling unit.

7. The vehicular lamp as claimed in claim 6, wherein the voltage applying unit comprises a plurality of resistors, a plurality of NPN transistors, and a plurality of constant voltage sources.

8. The vehicular lamp as claimed in claim 6, wherein the current controlling unit comprises an operational amplifier, an nMOS transistor, and a resistor.

9. The vehicular lamp as claimed in claim 6, wherein the current controlling unit comprises a pulse width modulation controller, an operational amplifier, an nMOS transistor, a diode, a condenser, a resistor, and a transformer.

10. A vehicular lamp comprising:
    a semiconductor light-emitting element;
    a current controlling unit operable to increase an electric current flowing into said semiconductor light-emitting element according to a signal output from a sensor depending on a brightness of the circumference of the vehicle when the circumference of the vehicle is bright; and
    a turn switch-controlled current supplying unit operable
    to supply an electric current to said semiconductor light-emitting element via said current controlling unit when a DRL signal input from a vehicle main body is active and a turn switch signal and a position signal input from the vehicle main body are non-active,
    to supply an electric current sufficient to illuminate said semiconductor light-emitting element as a turn signal lamp to said semiconductor light-emitting element without passing through said current controlling unit when the turn switch signal is active and a turn signal input from the vehicle main body is active, and
    not to supply an electric current to said current controlling unit and said semiconductor light-emitting element when the position signal is active and the turn signal is non-active.

11. A vehicular lamp comprising:
    a semiconductor light-emitting element;
    a current controlling unit operable to increase an electric current flowing into said semiconductor light-emitting element according to a signal output from a sensor depending on a brightness of the circumference of the vehicle when the circumference of the vehicle is bright wherein the sensor outputs a voltage depending on brightness of the circumference of the vehicle, said current controlling unit controls the current flowing into said semiconductor light-emitting element according to the received voltage;
    a turn switch-controlled voltage applying unit operable
    to apply a voltage output from the sensor to said current controlling unit when a DRL signal input from a vehicle main body is active and a turn switch signal and a position signal input from the vehicle main body are non-active,
    to apply a voltage, by which said current controlling unit flows an electric current sufficient to illuminate said semiconductor light-emitting element as a turn signal lamp into said semiconductor light-emitting element, to said current controlling unit without applying the voltage output from the sensor to said current controlling unit when the turn switch signal is active and a turn signal input from the vehicle main body is active, and
    to apply a voltage, by which said current controlling unit does not flow an electric current into said semiconductor light-emitting element, to said current controlling unit without applying the voltage output from the sensor to said current controlling unit when the position signal is active and the turn signal is non-active.

* * * * *